(12) United States Patent
Fraisse et al.

(10) Patent No.: US 6,928,158 B1
(45) Date of Patent: Aug. 9, 2005

(54) TRANSMISSION OF A CLOCK BY A CAPACITIVE ISOLATING BARRIER

(75) Inventors: Christian Fraisse, Grenoble (FR); Claude Renous, Grenoble (FR)

(73) Assignee: STMicroelectronics S.A., Gentilly (FR)

(*) Notice: Subject to any disclaimer, the term of this patent is extended or adjusted under 35 U.S.C. 154(b) by 582 days.

(21) Appl. No.: 09/690,634

(22) Filed: Oct. 17, 2000

(30) Foreign Application Priority Data

Oct. 19, 1999 (FR) .............................. 99 13297

(51) Int. Cl.⁷ .......................... H04M 1/00; H04M 3/00; H04M 7/00
(52) U.S. Cl. ...................... 379/342; 379/341; 370/518; 327/292
(58) Field of Search .................. 375/214; 370/518, 370/395.61; 379/338, 399.01, 93.01, 93.05, 93.08, 341, 342; 377/47; 327/292, 298, 291

(56) References Cited

U.S. PATENT DOCUMENTS

| | | | | |
|---|---|---|---|---|
| 4,242,754 A | * | 12/1980 | DePouilly et al. | 375/359 |
| 5,655,010 A | * | 8/1997 | Bingel | 379/93.28 |
| 6,008,746 A | * | 12/1999 | White | 341/70 |

FOREIGN PATENT DOCUMENTS

EP   0 576 883   1/1994 ............ H02H/3/00

* cited by examiner

*Primary Examiner*—Binh Tieu
*Assistant Examiner*—Alexander Jamal
(74) *Attorney, Agent, or Firm*—Lisa K. Jorgenson; James H. Morris; Wolf, Greenfield & Sacks, P.C.

(57) ABSTRACT

A method and a circuit for regenerating a clock signal based on a flip-flop and on two complementary signals at the clock rate, the flip-flop being assembled as a divider by two of a combination of shaping signals each translating a direction, respectively rising or falling, of the edges of one of the complementary signals, and one of said shaping signals being used to reset the flip-flop.

21 Claims, 7 Drawing Sheets

TRANSMISSION OF A CLOCK BY A CAPACITIVE ISOLATING BARRIER

BACKGROUND OF THE INVENTION

1. Field of the Invention

The present invention generally relates to interface circuits between a transmission line (for example, a telephone line) and a modem adapted to transmitting and receiving data. Such interface systems especially have the function of isolating the transmission line from the rest of the user equipment, in particular due to voltage level differences between the user equipment and the signals carried by the transmission line. The present invention more specifically relates to interface systems using a barrier of capacitive isolation of the transmitted signals.

2. Discussion of the Related Art

The principle of such a capacitive isolation is based on a transposition of the useful frequency band (baseband) to a much higher frequency band by means of a modulation-demodulation system. The useful band ranges, in the example of telephone lines, from 300 to 3400 Hz. The transposition of the useful frequency band, necessary to transpose the telephone frequency band from 300 to 3400 Hz generally used as a carrier of data transmissions on the line, also enables decreasing the respective sizes of the capacitors to be used for the isolation barrier.

It is accordingly necessary to have, on either side of the capacitive isolation barrier through which the modulated signals transit, modulation and demodulation means that provide, either to the line or the user equipment, the signals in the useful frequency band.

FIGS. 1, 2, and 3 very schematically show a conventional example of interface with a capacitive isolation barrier between a transmission line and a modem. FIG. 1 shows in more detail the system portion on the modem side. FIG. 2 very schematically shows an example of a modulator for transposing the modem passband to the high isolation barrier crossing frequency (for example, a 1-MHz carrier). FIG. 3 shows in more detail the circuit on the line side.

An interface system to which the present invention relates, illustrated in FIGS. 1 to 3, is based on the use of an isolation barrier 1 formed with an assembly of capacitors C1, C2, C3, C4, C5, and C6 via which transit signals modulated on a high frequency carrier (for example, on the order of one MHz), between a processing circuit 2 on the equipment side (modem) and a processing circuit 3 on the line side.

As illustrated in FIG. 1, signal processing circuit 2 on the modem side essentially includes a modulator (MOD) 21 of the signals to be transmitted on the line and a demodulator (DEMOD) 22 of the signals received from the line. Modulator 21 receives the signals to be transmitted, in differential form, from two outputs Tx+ and Tx– of an amplifier (Tx) 23 having its differential inputs E+ and E– receiving the signals to be transmitted in the baseband (for example, from 300 to 3400 Hz). Amplifier 23 forms, for example, in a simplified way, the radiofrequency transmission head of the modem. Amplifier 23 is, for example, based on a low-noise amplifier.

Modulator 21 also receives a clock signal CK provided by a generator (GEN) 24. Clock signal CK corresponds, on the side of circuit 2, to the high-frequency carrier to which the transmission band must be transposed to pass isolation barrier 1. Two differential outputs St+ and St– of modulator 21 are respectively connected to a first armature of capacitors C1 and C2, the second respective armatures of which are connected to inputs Et+ and Et– of a demodulator (DEMOD) 31 of processing circuit 3 on the line side, as will be seen hereafter in relation with FIG. 3. To enable a proper crossing of isolation barrier 1, the modulation is performed with a carrier suppression, which amounts to multiplying the signal to be modulated by 1 or –1, at the frequency of clock CK.

Symmetrically, demodulator 22 of processing circuit 2 on the equipment side includes two differential inputs Er+ and Er– originating from respective first armatures of capacitors C3 and C4 of isolation barrier 1. The second respective armatures of capacitors C3 and C4 are connected, on the side of circuit 3, to two output terminals Sr+ and Sr– of a reception modulator (MOD) 32 that will be described hereafter in relation with FIG. 3.

Demodulator 22 is intended for restoring the signals received from the transmission line that have been modulated on the high-frequency carrier of crossing of isolation barrier 1, to provide these signals Rx+ and Rx– in differential form to a receive amplifier 25 (Rx). Amplifier 25 represents, for example, the receive head of the modem and provides, on two outputs S+ and S–, the signals received in differential form. Demodulator 22 also receives clock signal CK from generator 24 to enable the demodulation.

To enable recovering the data in the telephone band, be it on the user equipment side or on the line side, the modulation and demodulation clocks must be synchronous on either side of isolation barrier 1. For this purpose, the frequency of clock CK provided by circuit 24 is transmitted, from circuit 2 to circuit 3, in the form of two differential input signals CK+ and CK– transiting through two capacitors C5 and C6 of barrier 1.

FIG. 2 very schematically illustrates an example of structure of modulator 21 of the signals to be transmitted. Such a modulator is based on the use of switches K1, K2, K3, and K4 that are controlled by clock signal CK. Switches K1 and K2 receive, on a first terminal, signal Tx+. A second terminal of switch K1 forms output terminal St+ of the modulator while a second terminal of switch K2 is connected to output terminal St– of the modulator. Signal Tx– is sent onto the first respective terminals of switches K3 and K4. The second terminal of switch K3 is connected to terminal St+ while the second terminal of switch K4 is connected to terminal St–. Switches K1 and K2 are controlled to the on-state by signal CK while switches K3 and K4 are controlled to the off-state by signal CK. In other words, switches K1 and K2 are controlled by signal CK while switches K3 and K4 are controlled by the inverse of signal CK. In FIG. 2, these controls have been schematized by the direction of the arrows associated with the control terminals of switches K1, K2, K3, and K4. The operation of a multiplier such as illustrated in FIG. 2 is conventional and will not be detailed further.

As illustrated in FIG. 3, processing circuit 3 on the line side includes modulator 31 for restoring, in the transmission band, the signals to be transmitted that it receives in modulated form on terminals Et+ and Et–. The outputs of demodulator 31 are sent onto a transmission amplifier 33 (Tx) that provides the signals to be transmitted, transposed back into the base or useful band.

Demodulator 31 receives a clock signal CK' from a circuit 34 (REGEN) for regenerating a clock signal synchronous with signal CK on the equipment side, based on a reprocessing of signals CK+ and CK– received as an input by circuit 34.

On the receive side, modulator 32 that provides signals Sr+ and Sr− to capacitors C3 and C4 receives the received signals R'x+ and R'x− in the baseband from an amplifier 35, the respective inputs of which are, like the outputs of amplifier 33, connected to a duplexer 36 (4W/2W), the function of which is to perform a 4 wire-2 wire conversion. Circuit 36 generally includes echo cancellation means for eliminating, from the signal received from the line, the echo of the transmitted signal to enable a good reception. The telephone line has been symbolized by its two conductors TIP and RING at the output of duplexer 36.

The operation of an interface system such as illustrated in FIGS. 1 to 3 is known and will not be explained in detail. Only the elements to which the present invention applies, that is, more specifically, the clock transmission through isolation barrier 1, will be reviewed.

FIGS. 4A, 4B, 4C, 4D, and 4E schematically illustrate, in the form of timing diagrams, the clock transmission problem that the present invention aims at solving. FIG. 4A shows an example of a baseband signal meant to cross isolation barrier 1. For simplification, no account will be taken of the differential structure of the signals and only one useful signal has been shown in FIG. 4A. It may be any of signals Tx+, Tx−, R'x+, R'x−. For example, it is assumed that it is signal Tx+ referenced with respect to the common mode voltage VCM of the equipment.

FIG. 4B shows clock signal CK used for the modulation. The signal has been shown as being referenced with respect to common mode voltage VCM due to the multiplication by 1 and −1 effected by the modulator.

FIG. 4C illustrates the shape of signal St+obtained at the output of modulator 21. This signal includes rectangular pulses at the frequency of clock signal CK in an envelope formed with signal Tx+ and its inverse.

FIG. 4D shows an example of the shape of clock signal CK' recovered on the side of circuit 3. FIG. 4E shows the shape of signal T'x+ recovered at the output of demodulator 31. The demodulation is performed, like the modulation, by a multiplying by 1 or −1 by means of the clock signal, here by a multiplying of signal St+ by signal CK'.

An example of interface to which the present invention more specifically applies is described in U.S. Pat. No. 5,500,895, the content of which is incorporated in the present description by express reference.

A problem that is raised in the type of interface system has to do with disturbances that may affect clock signal CK' and that originate from radioelectric disturbances due, for example, to electric household appliances (for example, the starting of a motor or of a compressor of a refrigerator).

In conventional systems, such disturbances cause a phase inversion of the clock restored on the line side. Now, when clock signal CK' correctly restores signal CK, the shape of signal Tx+ is recovered. However, if the phase of signal CK' is inverted with respect to signal CK, for example, due to a parasitic disturbance p (FIG. 4D), the restored signal T'x+ then is in phase opposition with respect to signal Tx+. The modem that notices the error by checking algorithms must then reposition its demodulator on the new phases relation (the involved demodulator is that, not shown, of the actual modem, downstream of the receive head, and not the demodulator associated with the isolation barrier). Now, each disturbance of the modem reception causes a decrease of the transmission level to enable the modem algorithms to correct the received data. Further, once a modem has switched to a lower transmission level, it does not recover by itself to a better level until the end of the communication.

In conventional systems, the initial state of the regeneration circuit most often is random. It is thus possible to be, as soon as the beginning of a communication, in clock phase opposition. In this case, the modem already switches to a first lower level. If, afterwards, during the communication, a new parasitic pulse occurs, the modem switches to row a still lower level, due to the new clock phase inversion.

It should be noted that processing circuit 3, on the line side, performs other functions than those illustrated in FIG. 3. In particular, this circuit is used to detect the presence of a ringing and to detect a standardized line impedance (for example, on the order of 600 ohms). In certain cases, other capacitors are used in the isolation barrier to transmit other types of signals.

SUMMARY OF THE INVENTION

The present invention aims at overcoming the disadvantages of known capacitive isolation interface systems.

The present invention more specifically aims at providing a novel solution to enable a synchronous regeneration of a high-frequency modulation clock by a processing circuit on the line side.

The present invention also aims at providing a solution that is compatible with the rest of the functions of conventional interface circuits and, in particular, with a caller identification function during the ringing period.

A first solution that comes to mind would be to use a phase-locked loop (PLL) to obtain a correct clock on the line side. Such a solution must however be discarded, since a phase-locked loop would not detect a transient disturbance causing the phase inversion. Further, this solution would be particularly complex to implement.

It should be noted that the present invention aims at avoiding a phase inversion due to a random disturbance in the clock signal transmission and not at avoiding any phase shift between clock CK' on the line side and clock CK on the equipment side. Indeed, there necessarily is a slight phase shift between these clocks, which will not be taken into account and which is not disturbing as long as this phase shift is approximately regular, which is the case most of the time since it is a phase shift due to physical propagation times. Further, it may be provided, as for example in above-mentioned U.S. Pat. No. 5,500,895, to take account of the delays between logic layers of the system for the clock signal transmission (element 117, FIG. 6).

Another solution would be, if it was possible, to use software means to differentiate random disturbances due to the starting of an electric appliance from disturbances due to the line. Indeed, when dealing with line disturbances, it is normal for the modem to switch to a lower transmission level, while this is not justified in the case of a transient parasitic disturbance. However, nothing enables detecting the origin of the disturbance on the modem side, so that such a software solution would not be satisfactory.

The present invention originates from a novel analysis of the phenomena that cause the phase inversion problem of the regenerated clock signal on the line side. For the present inventors, this problem is due to the circuit used for this regeneration.

FIG. 5 shows a conventional example of a clock regeneration circuit 34 downstream of an isolation barrier 1 of an interface system between a telephone line and a modem. In FIG. 5, only circuit 34 has been shown, with capacitors C5 and C6 of transmission barrier 1 that transmit signals CK+ and CK− coming from block 24 (FIG. 1). To simplify, it is assumed that signals CK+ and CK− are identical on either side of capacitors C5 and C6. Circuit 34 is based on the use of a D flip-flop 40, an output terminal Q of which provides signal CK'. Terminal QB, providing the inverse of output signal Q, is connected to the D input of flip-flop 40. Clock input CLK of flip-flop 40 receives the output of a logic combination of signals reprocessed based on signals CK+ and CK−. Signals CK+ and CK− are, on the side of circuit 34, referenced to a voltage VDR corresponding to the voltage on the line side, recovered by a conventional line impedance circuit. The reference to potential VDR is obtained by connecting each terminal CK+ and CK− to a reference terminal VDR via a resistor, respectively, R1 or R2.

FIG. 5 will be discussed at the same time as its operation in relation with timing diagrams illustrating the characteristic signals at different points. These characteristic signals are illustrated, in an example, in FIGS. 6A to 6I.

FIGS. 6A and 6B show the respective shapes of signals CK+ and CK− referenced to potential VDR. To simplify, the respective high and low states of the logic signals of the present description have been symbolized by +1 and −1.

Signals CK+ and CK− each cross an RC cell having a small time constant to only recover the rising edges of signals CK+ and CK−, by referencing these edges to the ground. Thus, terminal CK+ is connected, via a capacitor C7, to a terminal A, and terminal CK− is connected, via a capacitor C8, to a terminal B. Terminals A and B are each connected, via a resistor R3, R4, to ground M. Two diodes D1, D2 connect terminal M to terminals A and B, the respective cathodes of diodes D1 and D2 being connected to terminal M. The function of the diodes is to ground the signals of nodes A and B. FIGS. 6C and 6D illustrate the respective shapes of signals VA and VB at terminals A and B. As illustrated by these drawings, only the rising edges of signals CK+ and CK− are retranscribed on signals VA and VB, respectively.

Nodes A and B are each connected to the input of an inverter 41, 42, the function of which is to shape signals VA and VB between the ground and potential VDR. Other circuits equivalent to inverters 41 and 42 may be used to reshape these signals. FIGS. 6E and 6F illustrate respective shapes of signals V41 and V42 at the output of inverters 41 and 42. To simplify the representations of the timing diagrams, no account has been taken of the propagation times in the inverters, and it has been assumed that their switching threshold is at 0 volt. Thus, signal V41 is high between two pulses of signal VA while signal V42 is high between two pulses of signal VB.

The respective outputs of inverters 41 and 42 are combined within a NAND gate 43, the output of which is connected to clock input CLK of D flip-flop 40. Flip-flop 40 is assembled as a divider by 2, that is, one edge out of two of output signal V43 of NAND gate 43 is selected to generate a rising edge of clock signal CK'. The shape of signal V43 at the output of the NAND gate is shown in FIG. 6G. This signal normally has a regular shape and exhibits a rising edge for each pulse of one of signals VA or VB.

The respective shapes of signal CK' (output Q of flip-flop 40) and of its inverse (output QB) are illustrated by the timing diagrams of FIGS. 6H and 6I.

As can be seen from these timing diagrams, output Q normally provides a signal of same clock frequency CK on the equipment side. With the difference of the propagation times, signal CK' has the same shape as signal CK+. However, in case of a transient disturbance, the phase of output Q is inverted. Such a transient disturbance is illustrated in the timing diagrams of FIG. 6 in the form of a pulse p occurring on signals VA and VB. Indeed, since it is a parasitic disturbance resulting, for example, from the powering-on of an electric household appliance, there is no reason for this disturbance to only occur on one of the signals. The occurrence of this disturbance causes an additional rising edge of signals V41 and V42 in a period of signals CK+ and CK−. This translates as an additional clock pulse at the input of flip-flop 40 that, accordingly, generates an excess switching at the output of this flip-flop. As illustrated in the right-hand portion of the timing diagrams of FIG. 6, the phase of signal Q is, from pulse p, inverted with respect to the left-hand portion of these drawings.

Among its objects, the present invention aims at providing a solution that adapts to a conventional flip-flop circuit such as illustrated in FIG. 5 and that is a particularly simple way of regenerating a clock on the line side.

More specifically, the present invention provides a method for regenerating a clock signal based on a flip-flop and on two complementary signals at the clock rate, the flip-flop being assembled as a divider by two of a combination of shaping signals each translating a direction, respectively rising or falling, of the edges of one of the complementary signals, and the method including using one of said shaping signals to reset the flip-flop.

According to an embodiment of the present invention, the method is applied to regenerating a clock signal downstream of a capacitive isolation barrier carrying the two complementary signals.

According to an embodiment of the present invention, an output of the flip-flop provides an image of a first one of said complementary signals, the flip-flop being reset on edges of the shaping signal of the other complementary signal.

The present invention also provides a circuit for regenerating a clock signal based on two complementary signals by means of a D flip-flop, a clock input of which receives the result of a logic combination of two shaping signals resulting from a filtering of the respective rising edges of the complementary signals, a reset input of the flip-flop receiving one of said shaping signals.

According to an embodiment of the present invention, the logic combination is of NAND type, the shaping signals being provided by inverters.

According to an embodiment of the present invention, the reset input of the flip-flop is connected at the output of the inverter for shaping the complementary signal, of which an output of the flip-flop provides an inverted image.

The present invention also relates to an interface system between a modem and a transmission line, of the type using a capacitive isolation barrier to transmit a clock for modulating the signals to be transmitted from the modem to a processing circuit on the line side, and including a clock regeneration circuit.

The foregoing objects, features and advantages of the present invention, will be discussed in detail in the following non-limiting description of specific embodiments in connection with the accompanying drawings.

DETAILED DESCRIPTION

Figure 1:
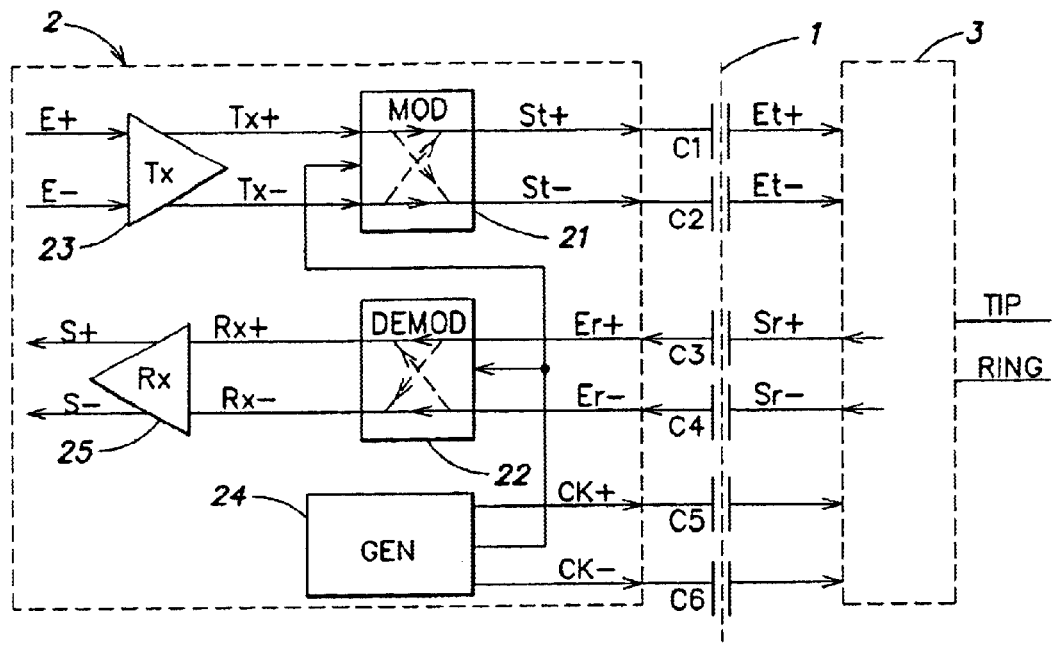
FIGS. 1 to 6, previously described, are intended for showing the state of the art and the problem to solve.
Figure 2:
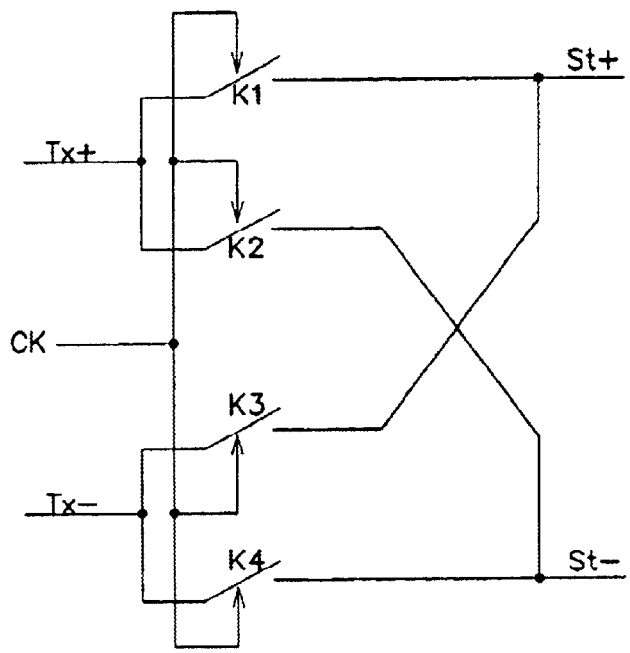

The same elements have been designated by the same references in the different drawings. For clarity, only those elements that are necessary to the understanding of the present invention have been shown in the drawings and will be described hereafter. In particular, the details constitutive of the processing circuits on the equipment side and on the line side will not be detailed any further since their structure and their operation are perfectly conventional.

A feature of the present invention is to provide a periodic reset of the clock generation means on the line side. In other words, the present invention provides setting the initial state of the flip-flop providing the clock signal downstream of the isolation barrier.

Another feature of the present invention is to use one of the signals regenerated by the circuit on the line side to directly reset the flip-flop.

Figure 5:
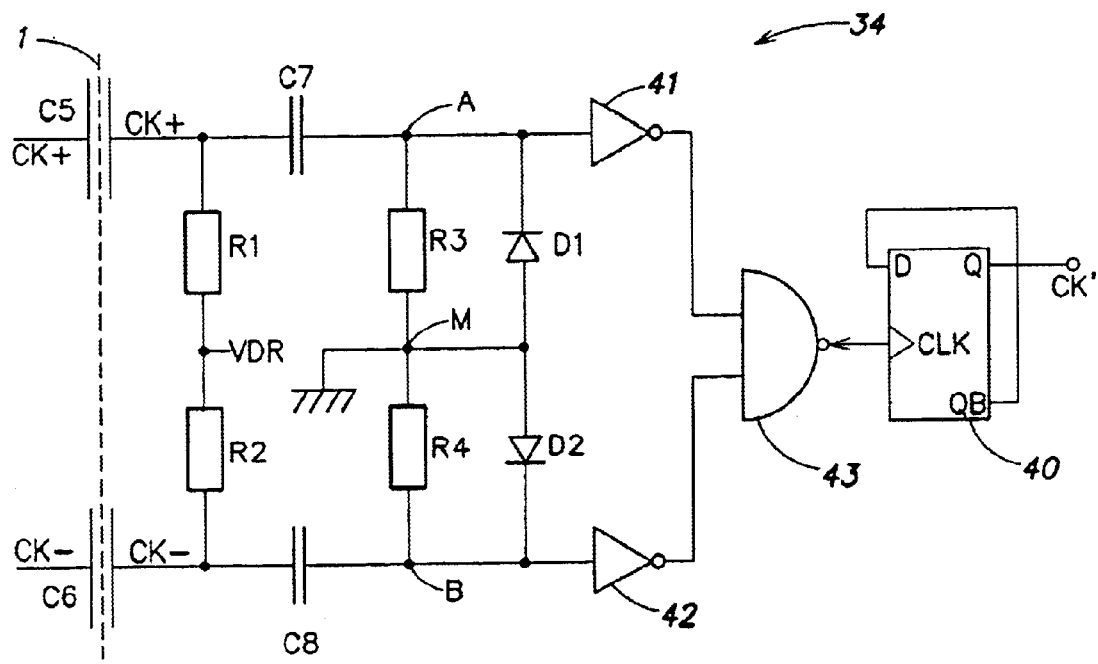
Figure 7:
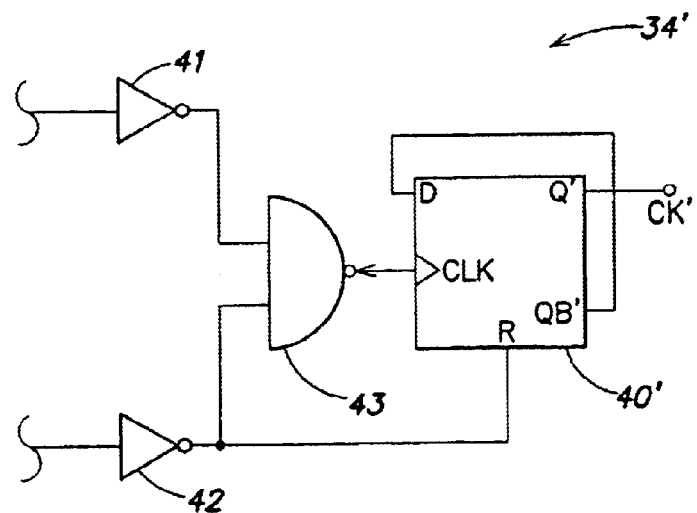
FIG. 7 partially shows an embodiment of a clock regeneration circuit according to the present invention.
Figure 6A:
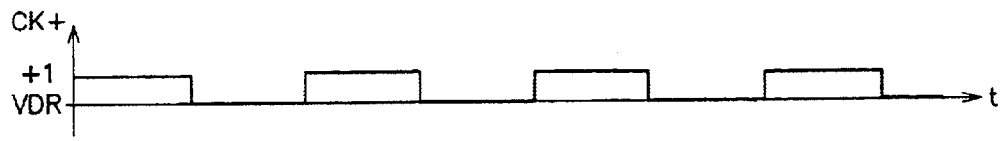
Figure 6B:
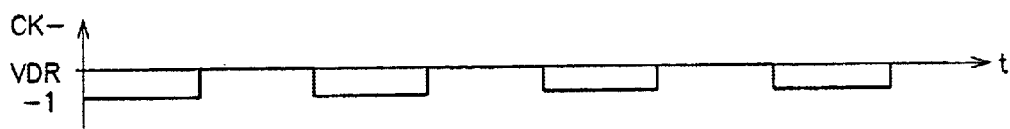
Figure 6C:
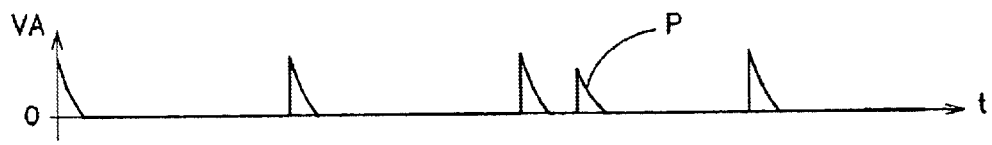
Figure 6D:
Figure 6E:
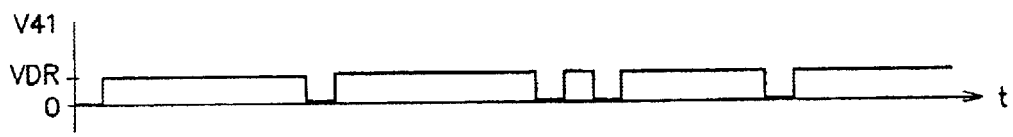
Figure 6F:
Figure 6G:
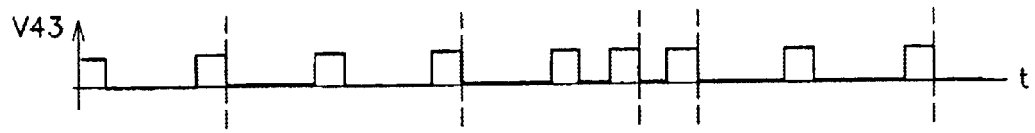
Figure 6H:
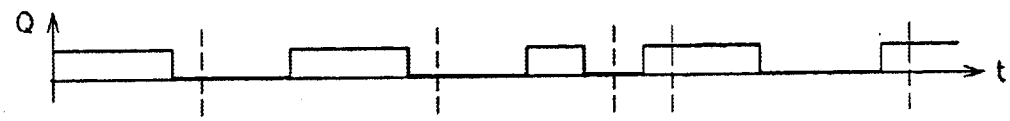
Figure 6I:
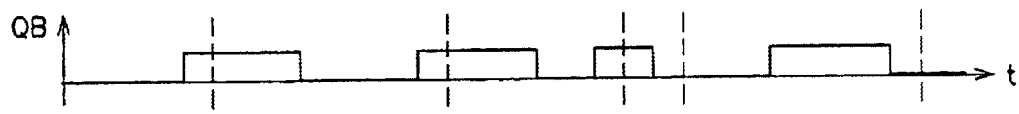

FIG. 7 shows a partial view of a clock signal regeneration circuit 34' according to the present invention. A circuit 34' according to the present invention includes all the elements of a circuit 34 such as illustrated in FIG. 5 so that only the logic circuit have been shown, for simplification. Thus, FIG. 7 shows inverters 41 and 42, NAND gate 43, and a flip-flop 40'.

According to the present invention, the periodic reset of flip-flop 40' is obtained by connecting a reset input R of this flip-flop to the output of inverter 42. Thus, implementing the present invention by means of a regeneration circuit based on a D flip-flop only requires one additional connection with respect to a conventional circuit.

It should be noted that flip-flop 40' is, as previously, assembled as a divider by 2, that is, one edge out of two of output signal V43 of NAND gate 43 is chosen to generate a rising edge of clock signal CK'.

Figure 8A:
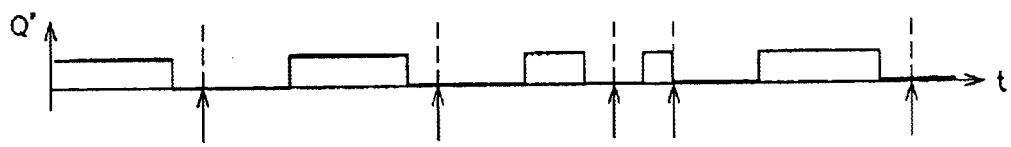
FIGS. 8A and 8B illustrate, in the form of timing diagrams, an embodiment of the clock regeneration method according to the present invention.
Figure 8B:
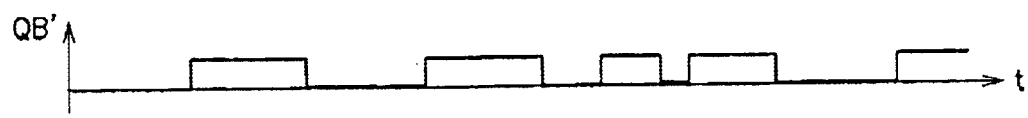

FIGS. 8A and 8B illustrate, in the form of timing diagrams, the shape of complementary signals obtained at the output of a D flip-flop 40' of a regeneration circuit such as illustrated in FIG. 7 by implementing the method of the present invention. FIGS. 8A and 8B should be considered together with FIG. 6 shown on the same plate since, except for the timing diagrams of FIGS. 6H and 6I, the other timing diagrams (6A to 6G) also apply to the present invention.

According to the present invention, flip-flop 40' is reset for each rising edge of signal V42, that is, at the output of the inverter, the falling edges of which determine the falling edges of signal Q'.

Thus, as illustrated in FIG. 8A by arrows, flip-flop 40' is reset to 0 for each rising edge of signal V42. A consequence thereof is that the state of output Q' of flip-flop 40' is always set to 0 before the occurrence of a falling edge of signal V41 triggering the state switching of output Q'. In other words, the D input of flip-flop 40' is always set to 1 before this state is read, to generate an edge on signal Q'.

As a consequence, the occurrence of a transient disturbance (p, FIGS. 6C and 6D) only disturbs output Q' over a duration smaller than one clock period. Indeed, at the next clock pulse, the flip-flop has been reset and thus recovers the same phase relation as before the disturbance.

Of course, other means than a D flip-flop such as illustrated in FIGS. 5 and 7 may be used to implement the method of the present invention. For example, a flip-flop having an input for setting to one and an input for setting to 0 respectively receiving signals V41 ad V42 may be used. In this case, the data input of the flip-flop will be grounded and its output will be used as a clock signal CK'. Such a circuit accordingly spares the use of a NAND gate.

Figure 3:
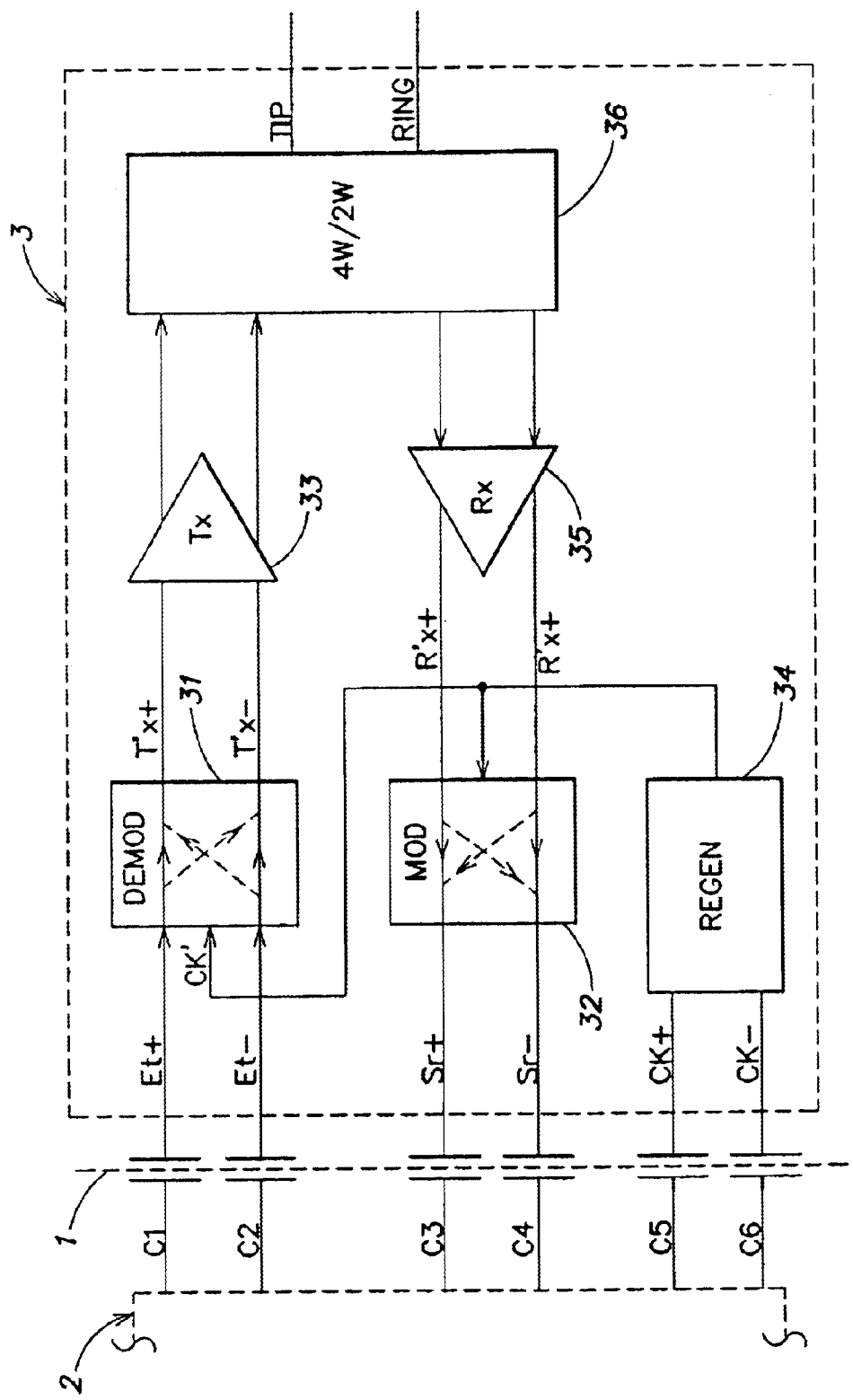
Figure 4A:
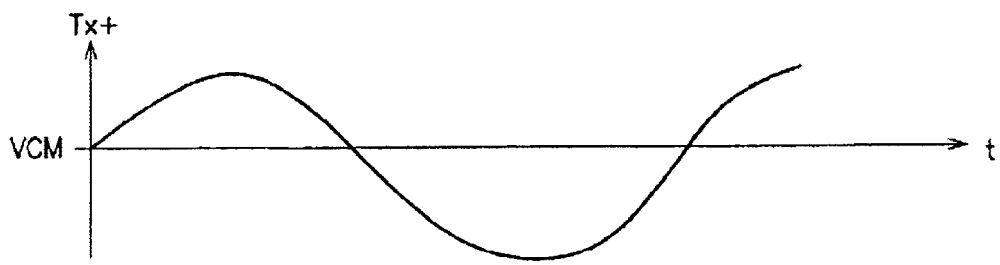
Figure 4B:
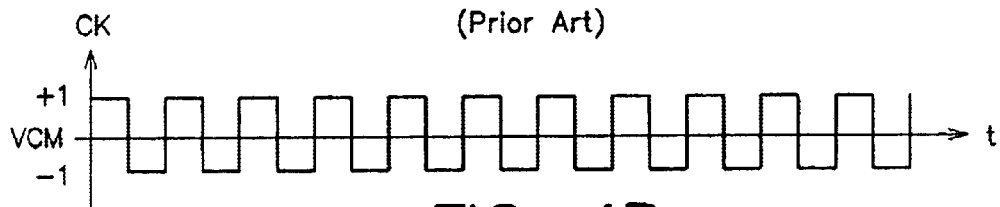
Figure 4C:
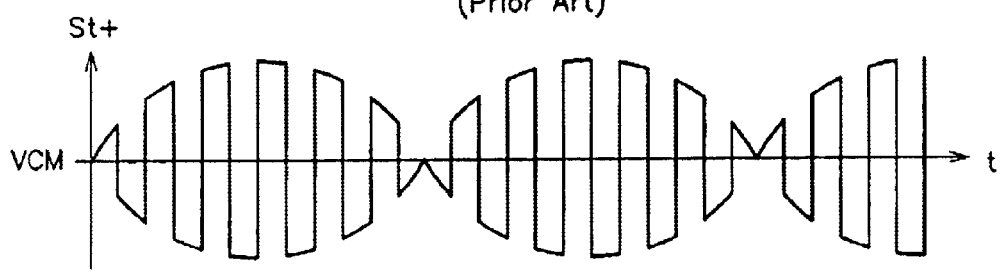
Figure 4D:
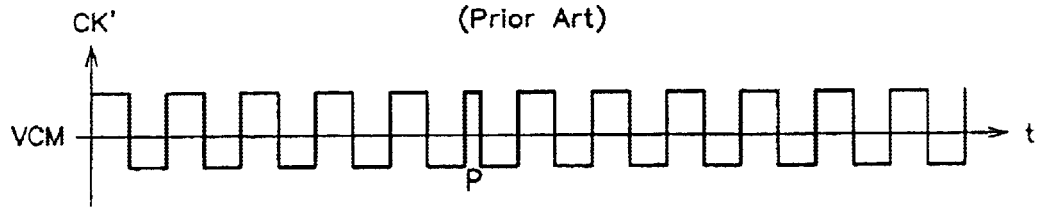
Figure 4E:
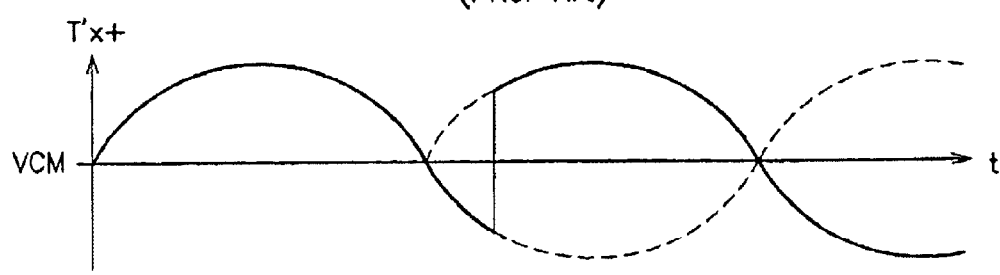
Figure 9A:
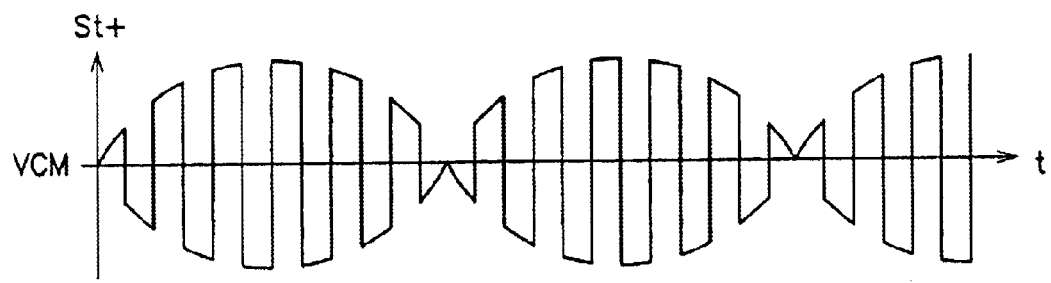
FIGS. 9A, 9B, and 9C illustrate the effect of a parasitic pulse on the recovery of the transmission signals, when implementing the present invention.
Figure 9B:
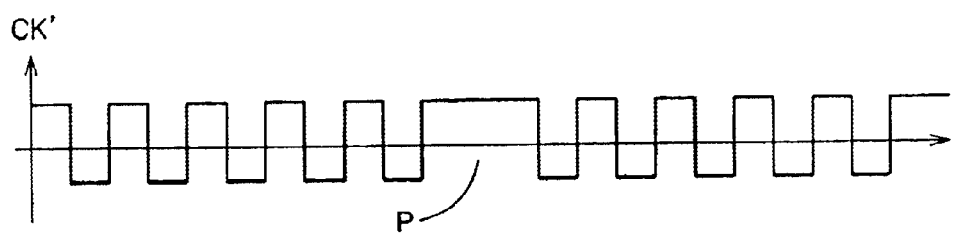
Figure 9C:
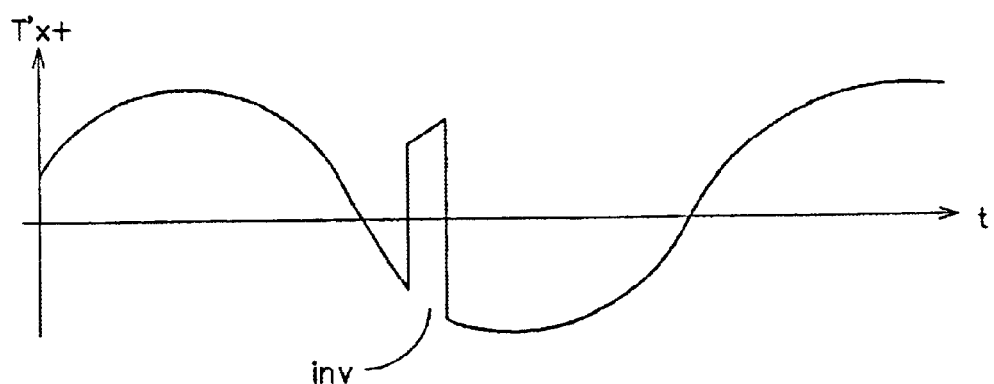

FIGS. 9A, 9B, and 9C illustrate, in the form of timing diagrams, the effects of the implementation of the method of the present invention on the baseband signal recovery by an otherwise conventional processing circuit (3, FIG. 3), downstream of the isolation barrier (1, FIGS. 1, 3). FIGS. 9A to 9C are to be considered together with previously discussed FIGS. 4C to 4E. FIG. 9A shows the example of signal St+ of FIG. 4A. FIG. 9B illustrates the shape of signal CK' obtained by means of the present invention, assuming the existence of a disturbance p as in FIG. 4D. FIG. 9C illustrates signal Tx+ obtained at the output of demodulator 31 (FIG. 3).

As appears from FIG. 9C, disturbance p translates as a temporary inversion inv of signal T'x+ during, at most, half a period of clock signal CK'. Afterwards, signal T'x+ recovers its normal shape since clock CK' has recovered its former shape.

An advantage of the present invention is that it suppresses or eliminates the effects of transient disturbances that are not due to the actual transmission line and that originate from external appliances, for example electric household appliances.

Another advantage of the present invention is that it is particularly simple to implement, especially in an interface system such as described in above-mentioned U.S. Pat. No. 5,500,895.

Another advantage of the present invention is that it is compatible with a caller identification operating mode that, during a predetermined period at the beginning of the communication, suppresses one of signals Tx+ or Tx− and divides the clock by 2. In this case, the clock regeneration circuit of the present invention still operates, but without setting the phase relation during this period, since a single signal is present at the output of inverters 41 and 42.

It should be noted that this absence of a flip-flop reset, during this caller identification period, presents a smaller risk since the rate is smaller than during data transmissions. Further, if an error occurs, this is generally less critical for the caller identification than for the actual data transmission.

Of course, the present invention is likely to have various alterations, modifications, and improvements which will readily occur to those skilled in the art. In particular, the sizing of the components of the clock regeneration circuit according to the present invention are within the abilities of those skilled in the art according to the functional indications given hereabove and to the application. Further, although the present invention has been described hereabove in relation with a telephone line interface system, it should be noted that the present invention applies to any system in which a capacitive isolation barrier is used, and which requires the transmission of a synchronous clock through this isolation barrier. Moreover, although the present invention has been described by using a given relation of the edges (rising, falling) of the different signals, adapting the present invention to the inverse relation (falling, rising) is within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for regenerating a clock signal based on a first complementary signal and a second complementary signal by means of a D flip-flop, a clock input of which receives the result of a logic combination of two shaping signals resulting from a filtering of the respective rising edges of the first and second complementary signals, wherein a reset input of the flip-flop receives one of said shaping signals, wherein the logic combination is of NAND type, the shaping signals being provided by inverters, and wherein the reset input of the flip-flop is connected at the output of the inverter for shaping the first complementary signal, of which an output of the flip-flop provides an inverted image.

2. An interface system between a modem and a transmission line, of the type using a capacitive isolation barrier to transmit a clock for modulating the signals to be transmitted from the modem to a processing circuit on the transmission line side of the interface system, including the clock regeneration circuit of claim 1.

3. A clock signal regeneration circuit, comprising:

a first input for a clock signal and a second input for an inverted clock signal;

logic to shape the clock signal into a first signal and the inverted clock signal into a second signal;

a flip-flop;

means for setting an initial state of the flip-flop after each alternate edge of the second signal, further comprising a NAND gate, wherein the first signal and the second signal are input to the NAND gate wherein the flip-flop is a D-type flip-flop, and wherein an output of the NAND gate is input to a clock input of the flip-flop.

4. The clock signal regeneration circuit of claim 3, wherein the clock signal regeneration circuit is located on a line side of a capacitive isolation barrier.

5. The clock signal regeneration circuit of claim 3, wherein the means for setting an initial state of the flip-flop comprises means for setting the initial state of the flip-flop after each rising edge of the second signal.

6. The clock signal regeneration circuit of claim 3, wherein the flip-flop comprises a reset input, and wherein one of the first signal and the second signal is coupled to the reset input.

7. The clock signal regeneration circuit of claim 3, wherein the logic comprises means for detecting each alternate edge of the clock signal and shaping the clock signal into a first signal having a single voltage pulse between each alternate edge of the clock signal, and means for detecting each alternate edge of the inverted clock signal and shaping the inverted clock signal into a second signal having a single voltage pulse between each alternate edge of the inverted clock signal.

8. The clock signal regeneration circuit of claim 7, wherein the logic comprises means for detecting each rising edge of the clock signal and shaping the clock signal into a first signal having a single voltage pulse between each rising edge of the clock signal, and means for detecting each rising edge of the inverted clock signal and shaping the inverted clock signal into a second signal having a single voltage pulse between each rising edge of the inverted clock signal.

9. The clock signal regeneration circuit of claim 3, wherein the logic comprises:

first and second resistors connected between the clock signal and the inverted clock signal;

a first capacitor coupled to the first clock signal and the first resistor; and a second capacitor coupled to the inverted clock signal and the second resistor.

10. The clock signal regeneration circuit of claim 9, wherein a reference voltage is coupled between the first and second resistors.

11. The clock signal regeneration circuit of claim 9, further comprising a first inverter coupled to the first capacitor and a second inverter coupled to the second capacitor.

12. The clock signal regeneration circuit of claim 11, wherein the output of the first inverter is the first signal and the output of the second inverter is the second signal.

13. The clock signal regeneration circuit of claim 3, wherein the flip-flop comprises a reset input, and wherein the second signal is coupled to the reset input.

14. A method of regenerating a clock signal, comprising acts of:

shaping a clock signal into a first signal and an inverted clock signal into a second signal; and setting an initial state of a flip-flop after each alternate edge of the second signal, wherein the flip-flop is coupled to the first and second signals, further comprising an act of inputting the first and second signals to a NAND gate, wherein the flip-flop is a D-type flip-flop, and wherein the method further comprises an act of inputting an output of the NAND rate to a clock input of the flip-flop.

15. The method of claim 14, wherein the acts of regenerating the clock signal are performed on a line side of a capacitive isolation barrier.

16. The method of claim 14, wherein the act of setting the initial state of the flip-flop comprises setting the initial state of the flip-flop after each rising edge of the second signal.

17. The method of claim 14, wherein the act of setting the initial state of the flip-flop comprises coupling one of the first signal and the second signal to a reset input of the flip-flop.

18. The method of claim 14, wherein the act of shaping comprises:

detecting each alternate edge of the clock signal and shaping the clock signal into a first signal having a single voltage pulse between each alternate edge of the clock signal; and detecting each alternate edge of the inverted clock signal and shaping the inverted clock signal into a second signal having a single voltage pulse between each alternate edge of the inverted clock signal.

19. The method of claim 14, wherein the act of shaping comprises:

detecting each alternate edge of the clock signal and shaping the clock signal into a first signal having a single voltage pulse between each rising edge of the clock signal; and detecting each alternate edge of the inverted clock signal and shaping the inverted clock signal into a second signal having a single voltage pulse between each rising edge of the inverted clock signal.

20. The method of claim 14, wherein the act of shaping includes shaping the first and second signals between ground and a reference potential.

21. The method of claim 14, wherein the flip-flop comprises a reset input, and wherein the method further comprises an act of inputting the second signal to the reset input.

* * * * *

UNITED STATES PATENT AND TRADEMARK OFFICE
CERTIFICATE OF CORRECTION

| | |
|---|---|
| PATENT NO. | : 6,928,158 B1 |
| APPLICATION NO. | : 09/690634 |
| DATED | : August 9, 2005 |
| INVENTOR(S) | : Christian Fraisse and Claude Renous |

It is certified that error appears in the above-identified patent and that said Letters Patent is hereby corrected as shown below:

Line 59 of col. 3 should read:
--then reposition its demodulator on the new phase relation--

Line 6 of col. 4 should read:
--a new parasitic pulse occurs, the modem switches to row a--

Signed and Sealed this

Tenth Day of April, 2007

JON W. DUDAS
*Director of the United States Patent and Trademark Office*